(12) United States Patent
Chen et al.

(10) Patent No.: US 7,576,807 B2
(45) Date of Patent: Aug. 18, 2009

(54) DISPLAY PANEL HAVING PARTICULAR CONNECTIONS BETWEEN CONDUCTIVE STRUCTURE WITH SHORTING BARS AND TESTING LINES

(75) Inventors: Hui-Chang Chen, Kaohsiung (TW); Tsung-Yu Lin, Kaohsiung (TW); Chin-Yu Huang, Yilan County (TW)

(73) Assignee: Au Optronics Corp., Hsinchu (TW)

( * ) Notice: Subject to any disclaimer, the term of this patent is extended or adjusted under 35 U.S.C. 154(b) by 596 days.

(21) Appl. No.: 11/427,416

(22) Filed: Jun. 29, 2006

(65) Prior Publication Data

US 2007/0177066 A1    Aug. 2, 2007

(30) Foreign Application Priority Data

Jan. 27, 2006   (TW) .............................. 95103472 A

(51) Int. Cl.
G02F 1/1333     (2006.01)
(52) U.S. Cl. .......................................... 349/40; 349/54
(58) Field of Classification Search .................. 349/40, 349/54
See application file for complete search history.

(56) References Cited

U.S. PATENT DOCUMENTS

| | | | | |
|---|---|---|---|---|
| 6,861,665 B2 * | 3/2005 | Kim | ............................. | 257/48 |
| 6,919,931 B2 * | 7/2005 | Chae | ............................. | 349/40 |
| 6,924,179 B2 * | 8/2005 | Oh et al. | ...................... | 438/157 |
| 7,081,770 B2 * | 7/2006 | Lee et al. | ..................... | 324/770 |
| 7,110,057 B2 * | 9/2006 | Jeon | ............................. | 349/40 |
| 7,223,642 B2 * | 5/2007 | Choi | ........................... | 438/151 |

FOREIGN PATENT DOCUMENTS

| CN | 1614483 | 5/2005 |
|---|---|---|
| TW | 200411191 | 7/2004 |

OTHER PUBLICATIONS

China Office Action mailed Jun. 15, 2007.

* cited by examiner

*Primary Examiner*—Mike Qi
(74) *Attorney, Agent, or Firm*—Thomas, Kayden, Horstemeyer & Risley

(57) ABSTRACT

A display panel comprising a substrate, a display array formed on the substrate, and a test circuit disposed on the substrate and comprising shorting bars, testing lines, a first and a second isolation layers, and a conductive structure. The shorting bars include a first short bar. The testing lines include a first testing line vertical with the first shorting bar and electrically connecting the display array. The first isolation layer is formed between the shorting bars and the testing lines. The second isolation layer is disposed on the shorting bars, the testing lines, and the first isolation layer and has a first and a second holes, which correspond to the first shorting bar. The second hole penetrates through the first isolation layer. The conductive structure is formed on the second isolation layer and electrically connects the first testing line and the first shorting bar through the first and second holes.

13 Claims, 3 Drawing Sheets

DISPLAY PANEL HAVING PARTICULAR CONNECTIONS BETWEEN CONDUCTIVE STRUCTURE WITH SHORTING BARS AND TESTING LINES

This application claims the benefit of Taiwan Patent Application Serial No. 95103472, filed Jan. 27, 2006, the subject matter of which is incorporated herein by reference.

BACKGROUND OF THE INVENTION

1. Field of the Invention

The invention relates to a display panel, and in particular to a display panel comprising a test circuit.

2. Description of the Related Art

FIG. 1 is a schematic diagram of a conventional test circuit. Test circuit 10 transmits test signals to circuit 14 and comprises shorting bars 111~113 and testing line 121~123. When a conductive material is disposed in holes 131~136, shorting bars 111~113 electrically connect testing lines 121~123. Holes 131~136 are disposed on a layer (not shown) between shorting bars 111~113 and testing lines 121~123.

Conductive material fills holes 131 and 132 for electrically connecting shorting bar 111 and testing line 121. Conductive material fills holes 133 and 134 for electrically connecting shorting bar 112 and testing line 122. Conductive material fills holes 135 and 136 for electrically connecting shorting bar 113 and testing line 123.

With technology development, the volume of integrated circuits is reduced. Because hole 132 is disposed between shorting bars 111 and 112 and hole 134 is disposed between shorting bars 112 and 113, the distance between shorting bars 111 and 112 is maintained at a fixed value and the distance between shorting bars 112 and 113 is maintained at the fixed value. Thus, the volume of test circuit 10 is not reduced such that cost is increased.

BRIEF SUMMARY OF THE INVENTION

Display panels are provided. An exemplary embodiment of a display panel comprises a substrate, a display array, and a test circuit. The display array is disposed on the substrate. The test circuit is disposed on the substrate and comprises shorting bars, testing lines, a first isolation layer, a second isolation layer, and a conductive structure. The shorting bars include a first short bar. The testing lines include a first testing line, which is vertical to the first shorting bar and electrically connects the display array. The first isolation layer is disposed between the shorting bars and the testing lines. The second isolation layer, disposed on the shorting bars, the testing lines, and the first isolation layer, has a first hole and a second hole corresponding to the first shorting bar. The second hole penetrates the first isolation layer. The conductive structure is disposed on the second isolation layer and electrically connects the first testing line and the first shorting bar via the first and second holes.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
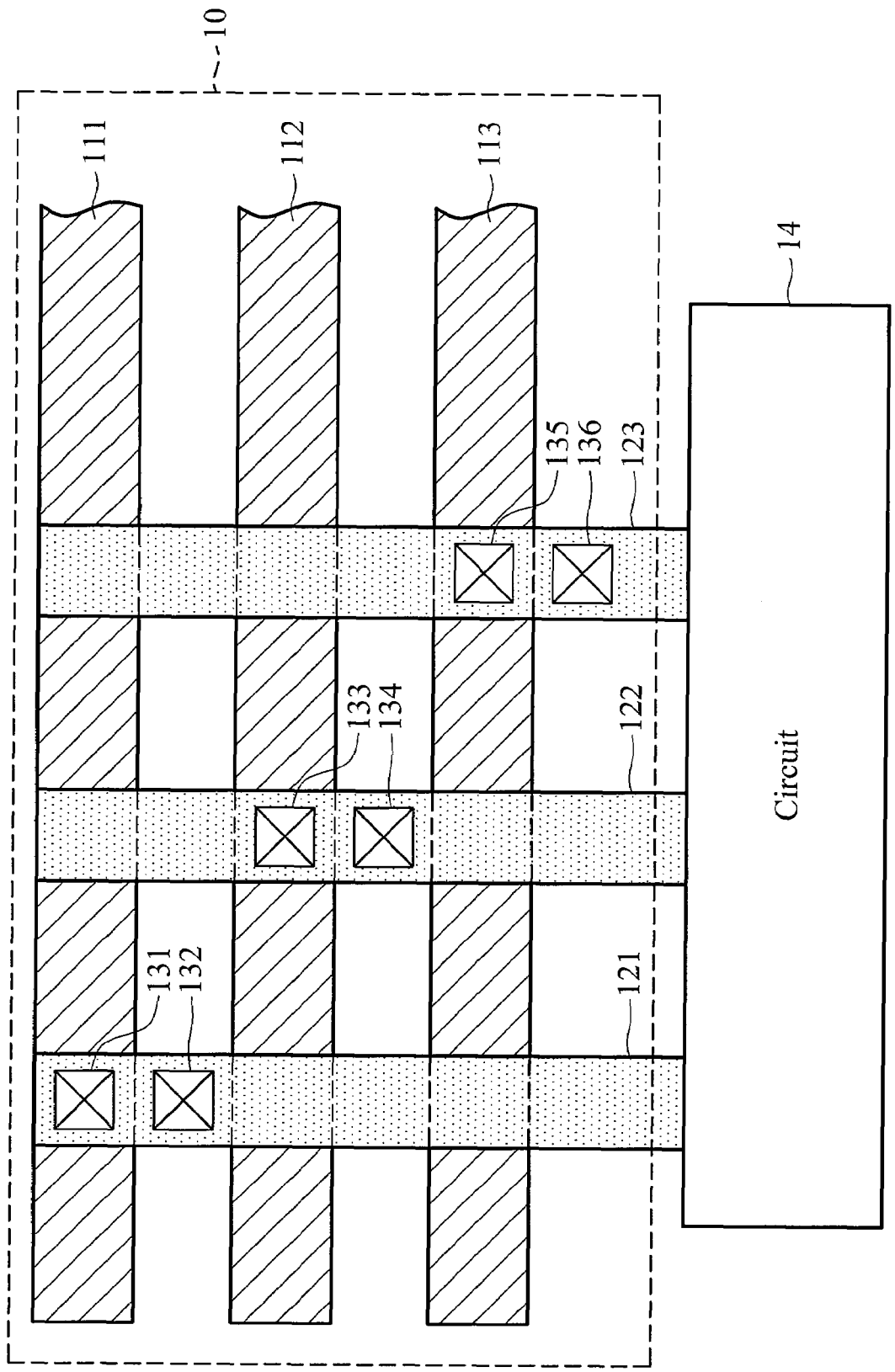
FIG. 1 is a schematic diagram of a conventional test circuit.
Figure 2:
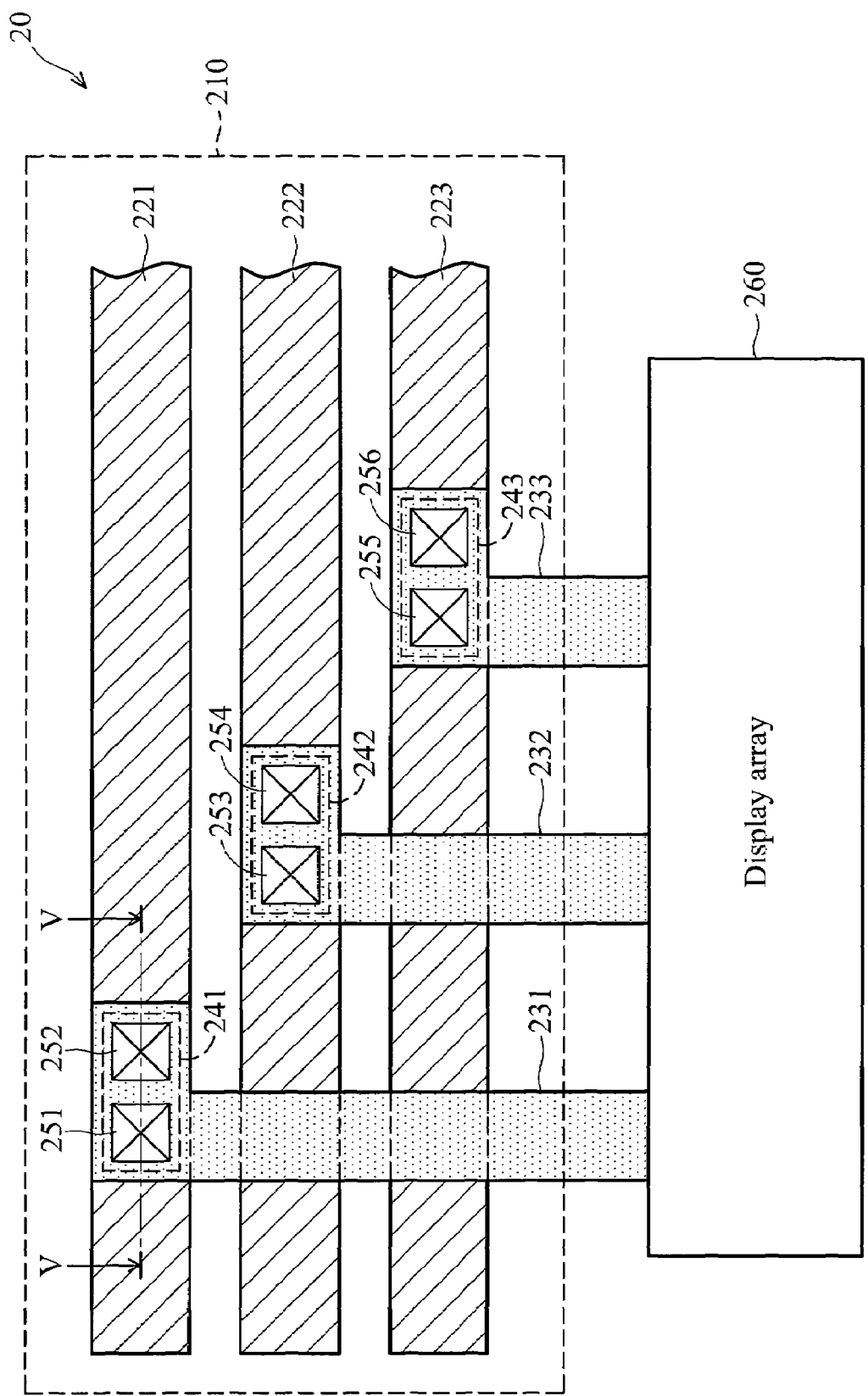
FIG. 2 is a schematic diagram of an exemplary embodiment of a display panel.

FIG. 2 is a schematic diagram of an exemplary embodiment of a display panel. Display panel 20 comprises a substrate (not shown), a test circuit 210 and a display array 260. Display panel 20 is an LCD panel. The substrate is glass or quartz. Display array 260 is disposed on the substrate. In this embodiment, display array 260 is a Thin Film Transistor (TFT) display array.

Test circuit 210 is disposed on the substrate and comprises shorting bars 221~223, testing lines 231~233, conductive structures 241~243, a first isolation layer (not shown), and a second isolation layer (not shown). The first isolation layer is disposed between shorting bars 221~223 and testing lines 231~233 for isolating shorting bars 221~223 and testing lines 231~233.

In this embodiment, the first isolation layer is disposed on shorting bars 221~223. Testing lines 231~233 are disposed on the first isolation layer. The second isolation layer is disposed on shorting bars 221~223 and testing lines 231~233. Conduction structures 241~243 are disposed on the second isolation layer.

Shorting bars 221~223 transmit test signals. Testing lines 231~233 are electrically connected between shorting bars 221~223 and display array 260 for transmitting test signals to display array 260 through shorting bars 221~223.

In this embodiment, shorting bars 221~223 are connected in parallel and testing lines 231~233 are connected in parallel. Shorting bars 221~223 vertically connect testing lines 231~233.

Conductive structure 241 electrically connects shorting bar 221 and testing line 231 via holes 251 and 252 corresponding to shorting bar 221. In this embodiment, conductive structure 241 electrically connects testing line 231 via hole 251 and connects shorting bar 221 and testing line 231 via hole 252.

Conductive structure 242 electrically connects shorting bar 222 and testing line 232 via holes 253 and 254 corresponding to shorting bar 222. In this embodiment, conductive structure 242 electrically connects testing line 232 via hole 253 and connects shorting bar 222 and testing line 232 via hole 254.

Conductive structure 243 electrically connects shorting bar 223 and testing line 233 via holes 255 and 256 corresponding to shorting bar 223. In this embodiment, conductive structure 243 electrically connects testing line 233 via hole 255 and connects shorting bar 223 and testing line 233 via hole 256.

Since holes 251~256 respectively correspond shorting bars 231~233, distance between shorting bars 221 and 222 and distance between shorting bars 222 and 223 are reduced for reducing space of test circuit 210. The distance between shorting bar 221 and shorting bar 222, or shorting bar 222 and shorting bar 223 is about 5 um~20 um, preferably about 5 um~10 um and most preferably less than 8 um.

Figure 3:
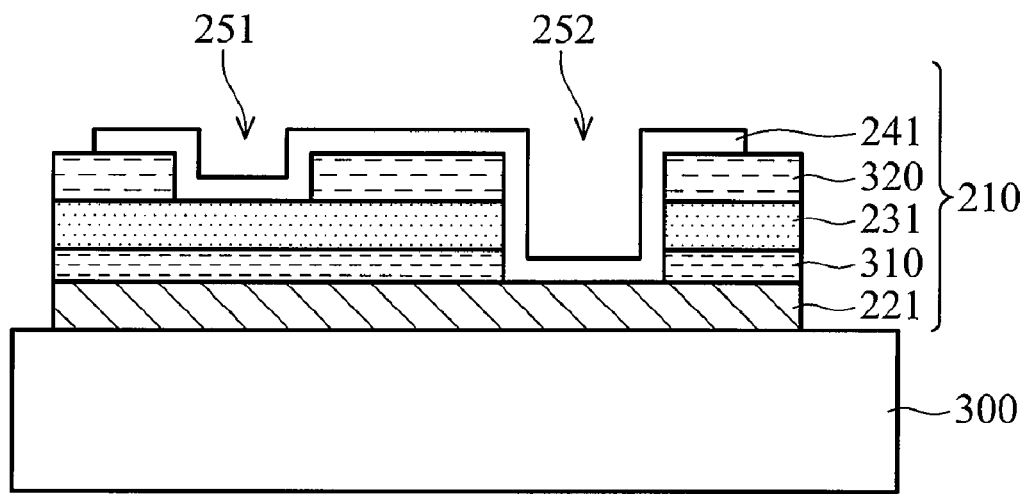
FIG. 3 is a cross-section of the display panel shown in FIG. 2.

FIG. 3 is a cross section of the display panel shown in FIG. 2. Test circuit 210 is disposed on a substrate 300. Shorting bar 221 is disposed on substrate 300. A first isolation layer 310 is disposed on shorting bar 221. Testing line 231 is disposed on first isolation layer 310. A second isolation layer 320 is disposed on testing line 231 and has holes 251 and 252. Second isolation layer 320 is penetrated by hole 251 for exposing testing line 231. Second isolation layer 320, testing line 231, and first isolation layer 310 are penetrated by hole 252 for exposing shorting bar 221. Conductive structure 241 is disposed on second isolation layer 320 and electrically connects testing line 231 and shorting bar 221 via holes 251 and 252.

Figure 4:
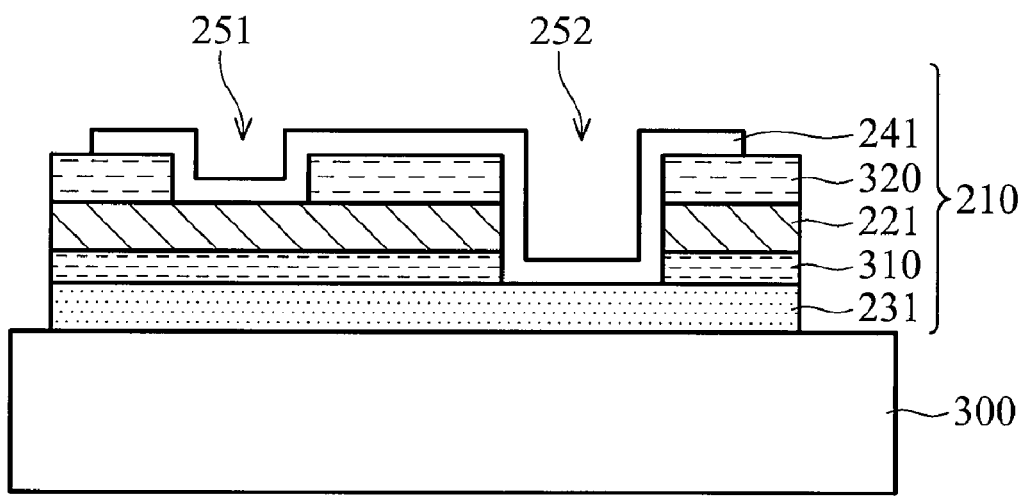
FIG. 4 is a cross-section of another exemplary embodiment of the display panel shown in FIG. 2.

Locations of shorting bars and testing lines are not limited. In some embodiments, shorting bar 221 is disposed on testing line 231 according to design of test circuit 210, that is to say, the locations of the shorting bar 221 and the testing line 231 in FIG. 3 are exchanged. As shown in FIG. 4, second isolation layer 320 is penetrated by hole 251 for exposing shorting bar 221. Second isolation layer 320, shorting bar 221, and first isolation layer 310 are penetrated by hole 252 for exposing testing line 231. Conductive structure 241 electrically connects shorting bar 221 and testing line 231 via holes 251 and 252.

Materials of shorting bars 221 and testing line 231 are molybdenum (Mo), aluminum (Al), titanium (Ti), a alloy of Mo and Al, or a group comprising Mo, Al, and Ti. Conductive structure 241 is an Indium Tin Oxide (ITO) or an Indium Zinc Oxide (IZO).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel, comprising:
    a substrate;
    a display array formed on the substrate; and
    a test circuit disposed on the substrate, comprising:
        a plurality of shorting bars including a first shorting bar;
        a plurality of testing lines including a first testing line vertical to the first shorting bar and electrically connected to the display array;
        a first isolation layer formed between the shorting bars and the testing lines;
        a second isolation layer formed on the shorting bars, the testing lines, and the first isolation layer, wherein the second isolation layer has a first hole and a second hole corresponding to the first shorting bar, and the second hole penetrates through the first isolation layer; and
        a conductive structure formed on the second isolation layer and electrically connected to the first testing line and the first shorting bar through the first and second holes, respectively.

2. The display panel as claimed in claim 1, wherein the first shorting bar is disposed below the first testing line.

3. The display panel as claimed in claim 2, wherein the first testing line is exposed by the first hole.

4. The display panel as claimed in claim 3, wherein the first shorting bar is exposed by the second hole.

5. The display panel as claimed in claim 1, wherein the first shorting bar is disposed over the first testing line.

6. The display panel as claimed in claim 5, wherein the first shorting bar is exposed by the first hole.

7. The display panel as claimed in claim 6, wherein the first testing line is exposed by the second hole.

8. The display panel as claimed in claim 1, wherein the conductive structure is comprised of Indium Tin Oxide (ITO) or Indium Zinc Oxide (IZO).

9. The display panel as claimed in claim 1, wherein the shorting bars are comprised of molybdenum (Mo), aluminum (Al), alloys of Mo and Al, or combinations thereof.

10. The display panel as claimed in claim 1, wherein the testing lines is comprised of titanium (Ti), aluminum (Al), alloys of Ti and Al, or combinations thereof.

11. The display panel as claimed in claim 1, wherein the substrate comprises glass or quartz.

12. The display panel as claimed in claim 1, wherein a distance between two adjacent shorting bars is about 5 um to 20 um.

13. The display panel as claimed in claim 1, wherein a distance between two adjacent shorting bars is about 5 um to 10 um.

* * * * *